US005668706A

United States Patent [19]

Sakai et al.

[11] Patent Number: 5,668,706

[45] Date of Patent: Sep. 16, 1997

[54] LOAD DRIVING CIRCUIT

[75] Inventors: Masayoshi Sakai; Koichi Futsuhara, both of Urawa, Japan

[73] Assignee: Nippon Signal Co., Ltd., Tokyo, Japan

[21] Appl. No.: 630,995

[22] Filed: Apr. 12, 1996

Related U.S. Application Data

[62] Division of Ser. No. 108,579, filed as PCT/JP93/00048, Jan. 14, 1993, Pat. No. 5,519,598.

[30] Foreign Application Priority Data

Jan. 14, 1992 [JP] Japan .................................... 4-5128
Jun. 9, 1992 [JP] Japan .................................... 4-149402

[51] Int. Cl.[6] .............................. H02M 3/335; G05F 1/56

[52] U.S. Cl. .............................. 363/21; 323/283

[58] Field of Search .............................. 363/16, 20, 21, 363/97, 131; 323/282, 283

[56] References Cited

U.S. PATENT DOCUMENTS

| | | | |
|---|---|---|---|
| 4,661,880 | 4/1987 | Futsuhara | 361/93 |
| 4,757,417 | 7/1988 | Futsuhara | 361/86 |
| 4,764,856 | 8/1988 | Rausch | 363/21 |
| 4,795,921 | 1/1989 | Kato et al. | 307/442 |

FOREIGN PATENT DOCUMENTS

| | | |
|---|---|---|
| 418 665 A1 | 3/1991 | European Pat. Off. . |
| 1235421 | 6/1959 | Germany . |
| 4010198A1 | 3/1990 | Germany . |
| 57-4764 | 6/1955 | Japan . |
| 57-15708 | 4/1982 | Japan . |
| 59-228703 | 12/1984 | Japan . |
| 59-229806 | 12/1984 | Japan . |
| 60-227326 | 11/1985 | Japan . |
| 60-223445 | 11/1985 | Japan . |
| 62-111519 | 5/1987 | Japan . |
| 3-14206 | 1/1991 | Japan . |

*Primary Examiner*—Matthew V. Nguyen
*Attorney, Agent, or Firm*—Lowe, Price, LeBlanc & Becker

[57] ABSTRACT

This invention relates to a load driving circuit having a fail-safe breaking mechanism for breaking a primary power source when a failure occurs. This invention also relates to a load driving circuit capable of saving electricity in driving an inductive load and reducing a delay in stopping the load. The breaking mechanism for braking the primary power source has no contact. The load driving circuit includes a power supply circuit involving a semiconductor switching element that turns ON and OFF the supply of power to the load. There is arranged a detector for detecting a failure in the semiconductor switching element. When detecting a failure, the detector provides an output signal to activate the breaking mechanism. To drive the inductive load, the power supply circuit may have two power supply sources. In response to a load driving instruction signal, the two power supply sources together apply a high voltage to the load. After a predetermined period, one of the power supply sources is stopped, and during a steady-state operation of the load, the remaining power source applies a low voltage to the load. The load driving instruction signal may be used to provide a pulse width modulated output, which is used to supply power to the load through a transformer. During a steady-state operation of the load, this arrangement supplies a voltage lower than an operation start voltage to the load, to thereby reduce power consumption and a delay in stopping the load.

9 Claims, 7 Drawing Sheets

LOAD DRIVING CIRCUIT

This application is a division of application Ser. No. 08/108,579, filed as PCT/JP93/00048 Jan. 4, 1993, now U.S. Pat. No. 5,519,598.

TECHNICAL FIELD

The first invention relates to a load driving circuit achieving excellent fail-safe performance with a non-contact breaking mechanism that breaks a primary power source if an abnormality occurs in the load driving circuit. The second invention relates to a load driving circuit for driving an inductive load that shows hysteresis involving different start and stop levels, employing a technique of lessening a delay in stopping the load. The third invention relates to a load driving circuit for driving a hysteresis load, employing a technique of saving electricity when driving the load.

BACKGROUND ART

Devices such as press controllers must provide a high degree of safety and must be fail-safe so that they are switched to a safety side when failures, short circuits, disconnections, etc., occur. Load driving circuits for driving loads such as motors and solenoids that are controlled must also be fail-safe.

One of the conventional load driving circuits directly connects a semiconductor switch such as a thyristor, a solid-state relay (hereinafter referred to as SSR), or an electromagnetic relay having contacts to a load in series and provides a load driving instruction signal to turn ON and OFF the switch or the relay, to thereby control the operation of the load.

If the semiconductor switch short-circuits or if the relay contact melts, a current will flow to the load even if there is no input signal (load driving instruction signal). Namely, the conventional circuit has a danger that it may erroneously provide an output to the load although there is no input. Such circuit is not fail-safe, and therefore, is unemployable for devices that require a high degree of safety. To be fail-safe, the load driving circuits may employ an electromagnetic relay having special contacts (for example, carbon contacts) that never melt. This sort of contacts, however, is short in service life.

To secure fail-safe characteristics, another type of load driving circuits has been proposed (Japanese Unexamined Patent Publication Nos. 60-223445 and 60-227326 and U.S. Pat. No. 4,661,880). These circuits directly control a load driving switch circuit with an input signal (load driving instruction signal) and monitor the ON/OFF status of the switch circuit through a fail-safe monitor circuit.

Upon detecting electricity supplied to a load with no input signal, the monitor circuit forcibly breaks a primary power source, to surely prevent the most serious accident during the operation of the load.

Another type of load driving circuits connects an input signal to a power supply circuit of a load via an electrically isolated signal receiving system involving a transformer. According to this type, an AC input signal (load driving instruction signal) is amplified by an amplifier, and the amplified signal is supplied to a primary winding of the transformer so that a secondary winding thereof may generate an alternating current. The alternating current is converted by a rectifier diode into a direct current, which is supplied to the power supply circuit of the load.

This arrangement involves no semiconductor switches that may cause short-circuit failures nor has the problem of short service lives of electromagnetic relays, thereby ensuring fail-safe characteristics.

Even of this type, load driving circuits of large capacity for, for example, presses usually employ contact breaking mechanisms having relays for breaking a primary power source that supplies electricity to a load. Since the contact breaking mechanisms always have the problem of melt and wear, they are unsatisfactory in reliability.

According to the technique of indirectly driving a load through a transformer in response to an input signal, the load will generate a counter-electromotive force when the input signal is turned OFF, if the load is a DC electromagnetic valve or relay that is inductive. The counter-electromotive force produces a discharge current, which flows to a power supply circuit of the load through a rectifier diode. This results in causing a delay in stopping the load after the turning OFF of the input signal.

Some loads such as electromagnetic valves and relays show hysteresis that an input level for starting the loads differs from an input level for stopping the loads. These hysteresis loads continuously operate if an input level sufficient for maintaining the operation is supplied thereto after the start thereof. In spite of this phenomenon, the prior art continuously supplies the starting input level as it is to the loads, thereby wasting electricity.

Accordingly, an object of the first invention is to provide a fail-safe load driving circuit employing a non-contact breaking mechanism for breaking a primary power source. An object of the second invention is to provide a load driving circuit for supplying a high voltage to start an inductive load showing hysteresis that an operation stop voltage is lower than an operation start voltage and supplying a voltage that is slightly higher than the operation stop voltage during a steady-state operation, thereby lessening a delay in stopping the load after the turning OFF of an input signal. An object of the third invention is to provide a load driving circuit that is capable of saving electricity when driving a hysteresis load.

DISCLOSURE OF INVENTION

The first invention provides a load driving circuit having a switching element that is connected to a load in series in a power supply circuit of a load and is directly turned ON and OFF by a load driving instruction signal, to control the supply of electricity to the load. The load driving circuit includes a switching power source having an input end electromagnetically coupled with a primary commercial AC power source through a first transformer and an output end electromagnetically coupled with the power supply circuit of the load through a second transformer, to supply a load driving current from the commercial AC power source to the power supply circuit of the load; a semiconductor switching element serving as the switching element connected in series with the load in the power supply circuit of the load, to close the power supply circuit in response to the load driving instruction signal and supply the current from the switching power source to the load; a semiconductor switching element status detector for detecting the ON/OFF status of the semiconductor switching element and providing a low level output of logical value 0 if the switching element is ON, a high-level output of logical value 1 if the switching element is OFF, and a low-level output of logical value 0 if the detector itself is out of order; and a power source stoppage decision unit for receiving an output of the semiconductor switching element status detector and the load driving instruction signal, determining that the switching element is abnormal if the output of the detector is at low level although there is no load driving instruction signal, and in this case, providing a low-level output to stop the power supplying operation of the switching power source.

This arrangement employs no contacts in stopping the primary power source when the semiconductor switching element for controlling the supply of power to the load becomes abnormal, and therefore, is fail-safe to surely disconnect the load from the primary power source against any abnormality.

The power source stoppage decision unit may employ fail-safe logical operation units to further improve fail-safe characteristics.

The second invention provides a load driving circuit for driving an inductive load showing hysteresis that an operation stop voltage is lower than an operation start voltage. The load driving circuit rectifies an AC signal prepared from a load driving AC instruction signal and supplies the rectified signal to the load, to thereby drive the load. The load driving circuit includes a first output supply unit for supplying a first rectified output to the load in response to the load driving instruction signal, the level of the first rectified output being higher than the operation stop voltage and lower than the operation start voltage; a second output supply unit for supplying a second rectified output to the load for a predetermined period in response to the load driving instruction signal, the second rectified output overlapping the first rectified output and being supplied to the load, the level of the overlapping first and second rectified outputs being higher than the operation start voltage.

The second invention supplies a high voltage to the load only to start the load, and thereafter, supplies a lower voltage than the operation start voltage to the load, to achieve a steady-state operation. This technique reduces energy accumulated in the load, to thereby shorten a period from the stoppage of the load driving instruction signal until the voltage to the load drops below the operation stop voltage and lessen a delay in stopping the load.

It is possible to arrange a zener diode in the power supply circuit of the load and a unit for monitoring a failure in the zener diode. As soon as a counter-electromotive force produced by the load decreases below a zener voltage after the load driving instruction signal is stopped, the power supply circuit of the load is opened. Accordingly, a delay in stopping the load is further reduced. When the failure monitoring unit detects a failure in the zener diode, the load driving instruction signal is stopped to secure fail-safe characteristics.

The third invention provides a load driving circuit for driving a load showing hysteresis that an operation start level of the load is higher than an operation stop level of the load. The load driving circuit rectifies an AC signal prepared from a load driving instruction signal and supplies the rectified signal to the load, to thereby drive the load. The load driving circuit includes a fail-safe load driving signal generator for providing a load driving instruction signal of logical value 1 representing a high energy state in response to a load driving enable signal, an output signal of logical value 0 representing a low energy state when not receiving the load driving enable signal, and an output signal of logical value 0 representing a low level state if the generator itself becomes out of order; a signal oscillator for generating a periodic oscillation output with the output of the load driving instruction signal generator serving as a power source, the oscillation output temporally inclining; a signal comparator for receiving the output of the load driving instruction signal generator as a power source, comparing the oscillation output of the signal oscillator with a threshold value that gradually rises with a predetermined time constant, and generating a pulse width modulated output that is at high level while the oscillation output is higher than the threshold value; an amplified AC output supply unit for amplifying the pulse width modulated output of the signal comparator through a sixth transformer and supplying the amplified AC output to a power supply circuit of the hysteresis load; and a seventh rectifier for rectifying the amplified AC output of the amplified AC output supply unit and supplying the rectified output to the load.

In this arrangement, the transformer provides the maximum output energy when the duty ratio of the pulse width modulated output is 50%. The output energy of the transformer decreases as the duty ratio becomes larger or smaller than 50%. Accordingly, the output energy supplied to the load gradually increases at first and exceeds the operation start level of the load. Thereafter, the output energy to the load decreases below the operation start level, and after a predetermined time, settles to a level that is slightly higher than the operation stop level. This arrangement is advantageous in reducing power supply after the start of the operation of the load, thereby saving electricity.

Since the output of the load driving instruction signal generator is used as a power source for the signal oscillator and signal comparator, the signal oscillator and signal comparator will never be activated if the load driving instruction signal generator provides no output signal. In addition, the load driving instruction signal generator has a fail-safe structure that never erroneously provides an output of logical value 1 representing a high energy state. A load driving output prepared from the load driving instruction signal is supplied to the load through the transformer. This arrangement enhances the fail-safe characteristics.

BEST MODE FOR CARRYING OUT THE INVENTION

Embodiments of the present invention will be explained in detail with reference to the drawings.

Figure 1:
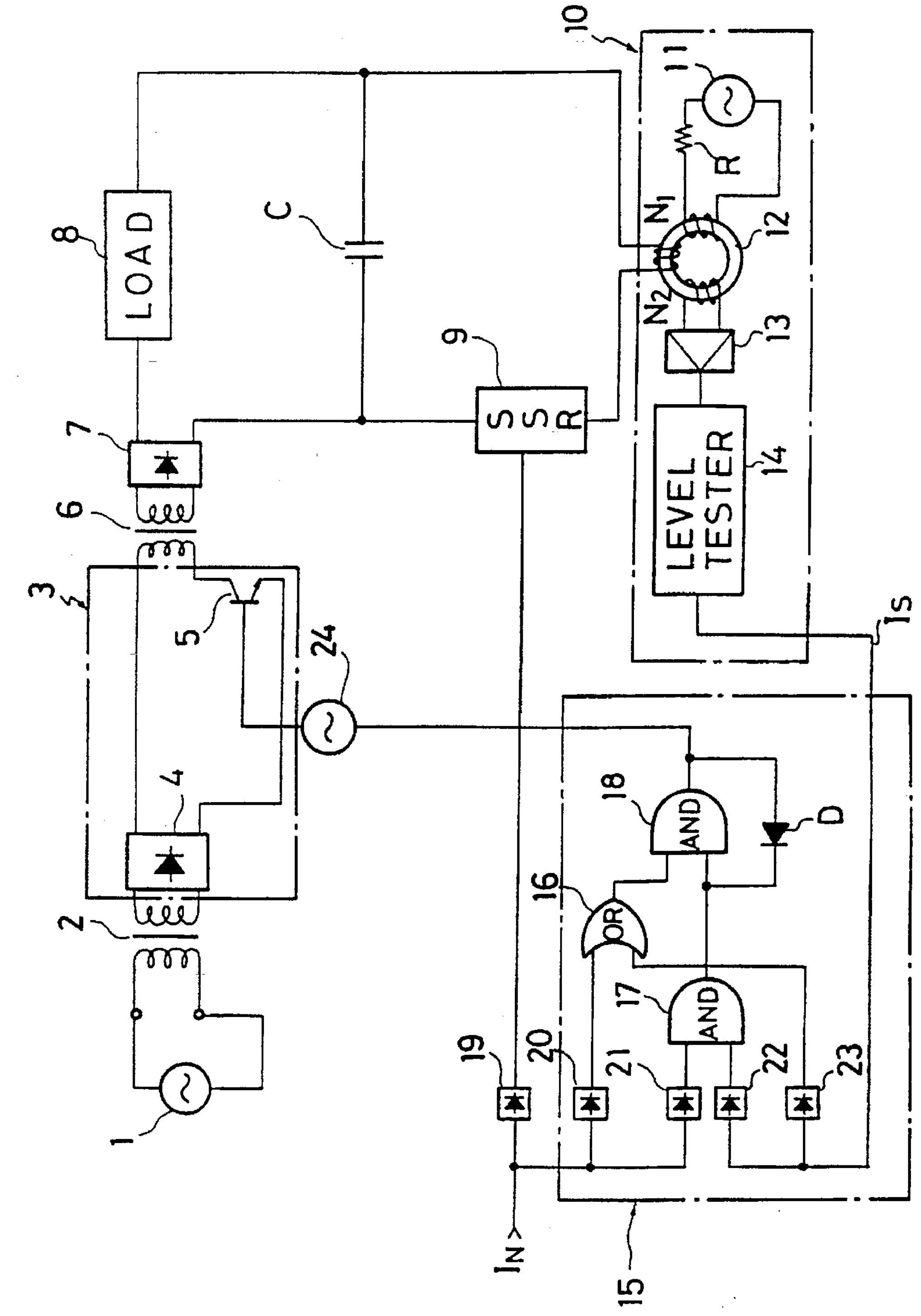
FIG. 1 is a circuit diagram showing a load driving circuit according to an embodiment of the first invention.

FIG. 1 shows an embodiment of the first invention.

FIG. 1, a commercial primary AC power source 1 provides an AC input, which is passed through a first transformer 2 and supplied to a switching power source 3. The switching power source 3 includes a first rectifier 4 for rectifying an AC output generated by a secondary winding of the first transformer 2; a transistor 5 connected in series with a primary winding of a second transformer 6 to be explained later; and a first signal generator 24 operating in response to an output of a decision circuit 15 to be explained later. The switching power source 3 is excited by an AC output of the first signal generator 24. Namely, the AC output of the first signal generator 24 turns ON and OFF the transistor 5, which passes the AC output produced from the AC input provided by the primary AC power source 1. The AC output of the switching power source 3 causes a secondary winding of the second transformer 6 to generate an AC output, which is rectified by a rectifier 7. The rectified output is supplied to a load 8 such as a motor or a solenoid.

A power supply circuit of the load 8 includes a switching element 9 (which may be a semiconductor switching element or a solid-state relay (SSR), the latter is used in this embodiment). The switching element 9 is closed in response to a load driving instruction AC signal $I_N$ rectified by a rectifier 19. In the figure, C is a capacitor.

An impedance sensor 10 is a semiconductor switching element status detector for determining whether or not the SSR 9 is ON. The impedance sensor 10 includes a second signal generator 11; a magnetic core 12 having a primary winding N1 for receiving an AC signal from the second signal generator 11 through a resistor R, a secondary winding N2 for receiving an AC signal from the primary winding N1, and a power supply line of the power supply circuit of the load; a second amplifier 13 for amplifying the signal received by the secondary winding N2; and a level tester for receiving the amplified AC output from the amplifier 13 and providing a high-level output if the amplified AC output is greater than a predetermined level.

When the SSR 9 is ON, the parallel-connected load 8 works to reduce a circuit impedance, thereby decreasing a voltage received by the secondary winding N2. As a result, an output $I_S$ of the level tester 14 falls to a logical value 0 to inform that the SSR 9 is ON. When the SSR 9 is OFF, the load 8 is disconnected to increase the circuit impedance, thereby increasing the voltage received by the secondary wining N2. As a result, the output $I_S$ of the level tester 14 rises to a logical value 1 to inform that the SSR 9 is OFF. The output $I_S$ of the level tester 14, i.e., the output of the impedance sensor 10 is sent to the decision circuit 15 serving as a power source stop decision unit.

The decision circuit 15 receives the output $I_S$ of the impedance sensor 10 and the load driving instruction signal $I_N$ for controlling the SSR 9. If the load driving instruction signal $I_N$ is absent and the output $I_S$ of the impedance sensor 10 is at low level (indicating that a current is flowing to the power supply line to the load), the decision circuit 15 determines it is abnormal and provides an output of low level to stop the first signal generator 24 of the switching power source 3, thereby stopping the supply of power from the switching power source 3 to the load 8.

The decision circuit 15 includes a fail-safe OR circuit 16 such as a wired-OR circuit for providing an OR of the load driving instruction signal $I_N$ and the output $I_S$ of the impedance sensor 10; a fail-safe first AND circuit 17 for providing an AND of the load driving instruction signal $I_N$ and the output $I_S$ of the impedance sensor 10; a fail-safe second AND circuit 18 for providing, as an abnormality decision output, an AND $\{(I_N \vee I_S)\cdot(I_N\cdot I_S)\}$ of the outputs of the OR circuit 16 and first AND circuit 17 and self-holding the torque of the first AND circuit 17 through a diode D; and rectifiers 20 to 23 for rectifying the load driving instruction signal $I_N$ and the output $I_S$ of the level tester 14. The first and second AND circuits 17 and 18 are known AND oscillators (disclosed in for example, Japanese Unexamined Utility Model Publication NO. 57-4764). The diode D forms a rectifier for feeding an AC output of the second AND circuit 18 back to an input end of the second AND circuit 18.

The decision circuit 15 provides an output of high level when the circuit 15 itself is normal, to drive the signal generator 24. The signal generator 24 generates an AC signal during operation, to turn ON and OFF the transistor 5, thereby activating the switching power source 3.

The operation of the load driving circuit of this embodiment will be explained.

The commercial primary AC power source 1 is set up to prepare for driving the load driving circuit. At this moment, the output $I_S$ of the impedance sensor 10 is at high level because the SSR 9 is open before receiving the load driving instruction signal $I_N$. Due to the high-level output $I_S$ of the impedance sensor 10, the OR circuit 16 provides an output of high level. Accordingly, one input of the second AND circuit 18 is high. One input of the first AND circuit 17 is also high. As soon as the load driving instruction signal $I_N$ is provided, the first AND circuit 17 provides an output of high level to the other input terminal of the second AND circuit 18, which provides an output of high level accordingly.

As a result, the first signal generator 24 provides an AC signal to the base of the transistor 5 of the switching power source 3, to turn ON and OFF the transistor 5 to drive the switching power source 3. A current from the commercial AC power source 1 is passed through the first and second transformers 2 and 6 and is supplied to the power supply circuit of the load 8. At this time, the SSR 9 is ON due to the load driving instruction signal $I_N$, to close the power supply circuit of the load 8 and supply the current to the load 8, which is then driven. When the SSR 9 is turned ON to supply the current to the power supply line for the load 8, the output $I_S$ of the impedance sensor 10 falls to low level. As a result, the first AND circuit 17 provides an output of low level to one input terminal of the second AND circuit 18. Since the output of the second AND circuit 18 is connected through the diode D to the input terminal that is at low level, the output of the second AND circuit 18 maintains high level by itself. The output of the second AND circuit 18 is continuously supplied to the first signal generator 24, which causes the switching power source 3 to continuously operate.

When the load driving instruction signal $I_N$ is stopped, the SSR 9 turns OFF to stop the supply of electricity to the load 8. Then, the output $I_S$ of the impedance sensor 10 rises to high level, and therefore, the output of the OR circuit 16 keeps high level even if the load driving instruction signal $I_N$ is stopped. Accordingly, the output of the second AND circuit 18 maintains high level to continuously activate the switching power source 3.

In this way, the supply of power to the load 8 is controlled according to the ON and OFF statuses of the toad driving instruction signal $I_N$ once the operation is started and if the load driving circuit is normal. To stop the operation of the circuit as a whole, the commercial primary AC power source 1 must be cut.

An operation when the SSR 9 is short-circuited will be explained.

When the SSR 9 is short-circuited, it is detectable because the output $I_S$ of the impedance sensor 10 falls to low level although the load driving instruction signal $I_N$ is absent. In this case, both inputs to the OR circuit 16 fall to low level, so that the second AND circuit 18 provides an output of low level to stop the signal generator 24. Accordingly, the ON/OFF operation of the transistor 5 of the switching power source 3 is stopped to deactivate the switching power source 3, so that no power is supplied to the load 8. Once the SSR 9 is short-circuited and the supply of a current to the power supply circuit of the load 8 is stopped, the output $I_S$ of the impedance sensor 10 maintains low level. The output of the first AND circuit 17, therefore, does not rise to high level, and even if the load driving instruction signal $I_N$ rises to raise the output of the OR circuit 16 to high level, the output of the first AND circuit 17 never rises to high level. Namely, one of the inputs to the second AND circuit 18 is kept at low level, to keep the switching power source 3 inactive.

When the impedance sensor 10 becomes out of order, the output $I_S$ of thereof falls to low level to continuously stop the switching power source 3.

The logical operation circuits 16 to 18 of the decision circuit 15 are fail-safe to provide an output of low level whenever any of them fails. Namely, if any one of them fails, the decision circuit 15 provides an output of low level to stop the switching power source 3.

If the transistor 5 of the switching power source 3 is short-circuited or causes an open failure, the switching power source 3 will not produce an AC output. Accordingly, the second transformer 6 generates no AC output. If the transistor 5 and rectifier 4 are each short-circuited, the second transformer 6 will not provide an output because the frequency of the output signal of the first transformer 2 is low.

In this way, this load driving circuit is safe against any failure because the circuit stops the supply of electricity to the load 8 and deactivates the load 8 if such failure occurs.

When the SSR 9 causes an open failure, the output $I_S$ of the impedance sensor 10 will be continuously high. In this case, the output of the second AND circuit 18 rises to high level irrespective of the load driving instruction signal $I_N$, to maintain the operation of the switching power source 3. The SSR 9, however is open to open the power supply circuit of the load 8 and supply no power to the load 8. The load 8, therefore, is never activated, to thereby secure the safety.

As mentioned above, the load driving circuit of this embodiment is controlled to the safety side against any circuit failure. Namely, this circuit is fail-safe and has a high degree of safety. Electricity is supplied to the load 8 through the non-contact switching power source 3. Unlike relays involving contacts, this arrangement is free from the problems of melt and wear. Compared with the conventional breaking mechanisms employing relays for breaking a primary power source, this embodiment of the present invention achieves improved safety and longer service life.

Load driving circuits according to the second invention will be explained with reference to FIGS. 2 to 6.

Figure 2:
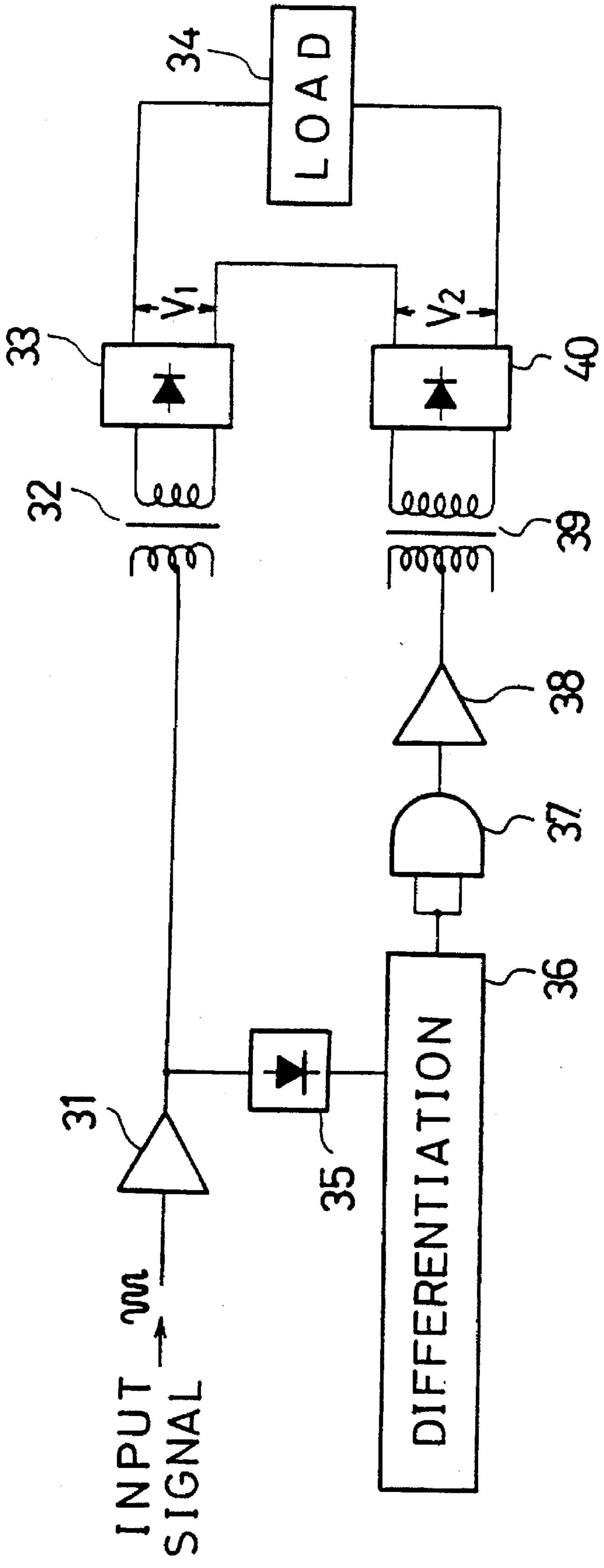
FIG. 2 is a circuit diagram showing a load driving circuit according to a first embodiment of the second invention.

FIG. 2 shows a load driving circuit according to a first embodiment of the second invention.

Figure 3:
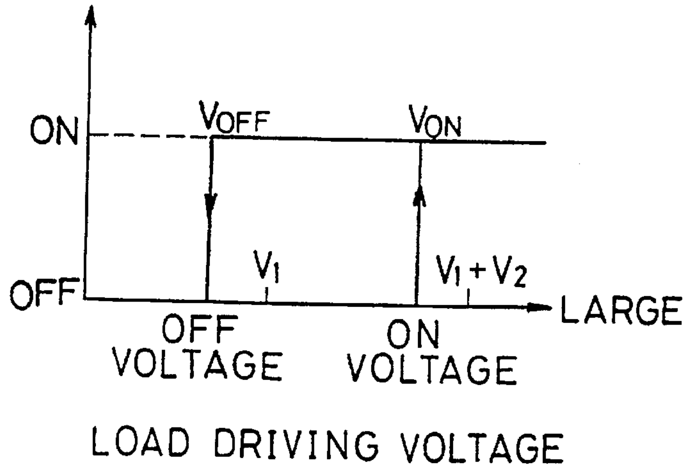
FIG. 3 is a view explaining the voltage hysteresis characteristics of a load of the above embodiment at the start and stop of the operation of the load.

In FIG. 2 an AC input signal corresponding to the load driving instruction signal $I_N$ of the first invention is amplified by an AC amplifier 31. The amplified input is supplied to a primary winding of a transformer 32. A secondary winding of the transformer 32 generates an AC voltage accordingly. The AC voltage is rectified by a rectifier 33 involving four diodes, and the rectifier 33 provides a first rectified output to an inductive load 34 such as a solenoid. As shown in FIG. 3, the load 34 shows hysteresis that an operation stop voltage $V_{OFF}$ of the load 34 is lower than an operation start voltage $V_{ON}$ thereof.

The amplified signal from the AC amplifier 31 is supplied to a second rectifier 35 too. The rectifier 35 provides a rectified signal to a differential circuit 36 having a predetermined time constant. An output of the differential circuit 36 is supplied to a fail-safe AND oscillator 37, which is a known one such as the first and second AND circuits of the first invention. An oscillation output of the AND oscillator 37 is amplified by a second AC amplifier 38. The amplified signal is supplied to a primary winding of a third transformer 39. A secondary winding of the transformer 39 generates an AC voltage accordingly for a predetermined period that is determined by the time constant of the differential circuit 36. The generated AC voltage is rectified by a fourth rectifier 40, which provides a second rectified output to the load 34.

As shown in FIG. 3, the rectified output voltage V1 of the rectifier 33 is higher than the operation stop voltage $V_{OFF}$ of the load 34 and lower than the operation start voltage $V_{ON}$ thereof. The rectified output voltage V2 of the rectifier 40 is set such that, when it overlaps the output voltage V1 of the rectifier 33, the sum of the overlapping voltages V1 plus V2 is higher than the operation start voltage $V_{ON}$ of the load 34. The transformer 32 and rectifier 33 form a first output supply unit, and the rectifier 35, differential circuit 36, AND oscillator 37, AC amplifier 38, transformer 39, and rectifier 40 form a second output supply unit.

Figure 4:
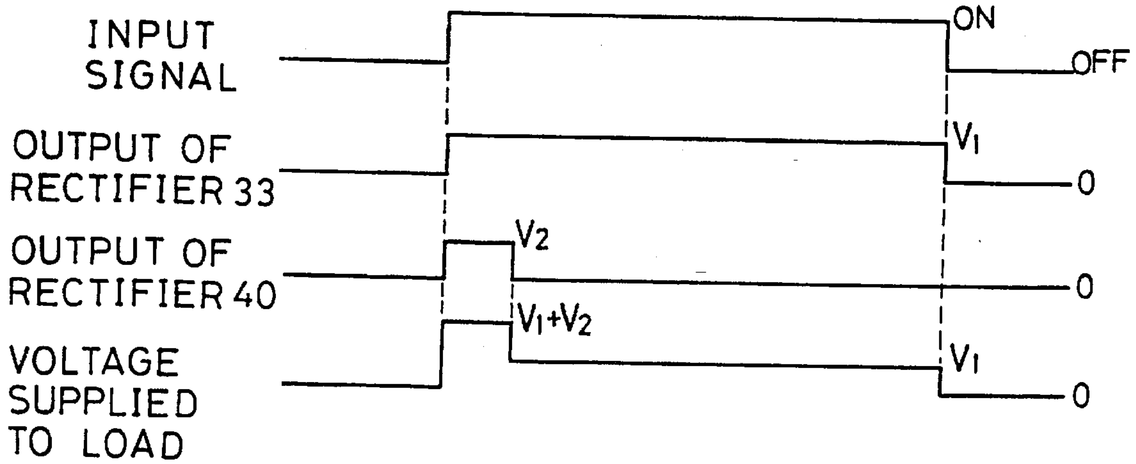
FIG. 4 is a time chart showing the states of power supplied to the load of the above embodiment.

The operation of the load driving circuit of this embodiment will be explained with reference to FIG. 4.

The input signal, i.e., the load driving instruction signal becomes ON and is amplified by the AC amplifier 31. The amplified signal is supplied to the primary winding of the transformer 32. The secondary winding of the transformer 32 generates an AC voltage, which is rectified by the rectifier 33 into the rectified output V1. At the same time, the amplified output of the AC amplifier 31 is rectified by the rectifier 35 and is differentiated by the differential circuit 36. According to the differentiated signal, the AND oscillator 37 provides an AC output, which is amplified by the AC amplifier 38. The amplified signal is supplied to the primary winding of the transformer 39. The secondary winding of the transformer 39 generates an AC voltage accordingly, which is rectified by the rectifier 40 into the rectified output V2. To start the load, the rectified voltages V1 and V2 overlap each other to form a voltage (V1+V2) that is higher than the operation start voltage $V_{ON}$ of the load 34. The overlapping voltages are supplied to the load 34. After the predetermined period from the reception of the input signal, the differentiated signal disappears to stop the AC output of the AND oscillator 37. Accordingly, the rectified output V2 of the rectifier 40 disappears. Thereafter, only the rectified voltage V1 of the rectifier 33, which is slightly higher than the operation stop voltage $V_{OFF}$ of the load 34, continuously drives the load 34.

When the input signal becomes OFF, the rectified output V1 of the rectifier 33 stops, and similar to the prior art, the load 34 generates a counter-electromotive force, which causes a discharge current. Since the driving voltage (current) supplied to the load 34 is lower than that of the prior art, energy accumulated in the load 34 at the time of stoppage is smaller. This results in shortening a period from the turning OFF of the input signal to a moment when the counter-electromotive force produced by the load becomes lower than the operation stop voltage $V_{OFF}$, thereby lessening a delay in stopping the load after the issuance of a load stopping instruction signal.

A resistor may be interposed in series with the power supply line to the load, to further lessen the delay.

A load driving circuit according to a second embodiment of the second invention will be explained with reference to FIG. 5. The same parts as those of the first embodiment of FIG. 2 will be represented with like reference marks and their explanations will not be repeated.

Figure 5:
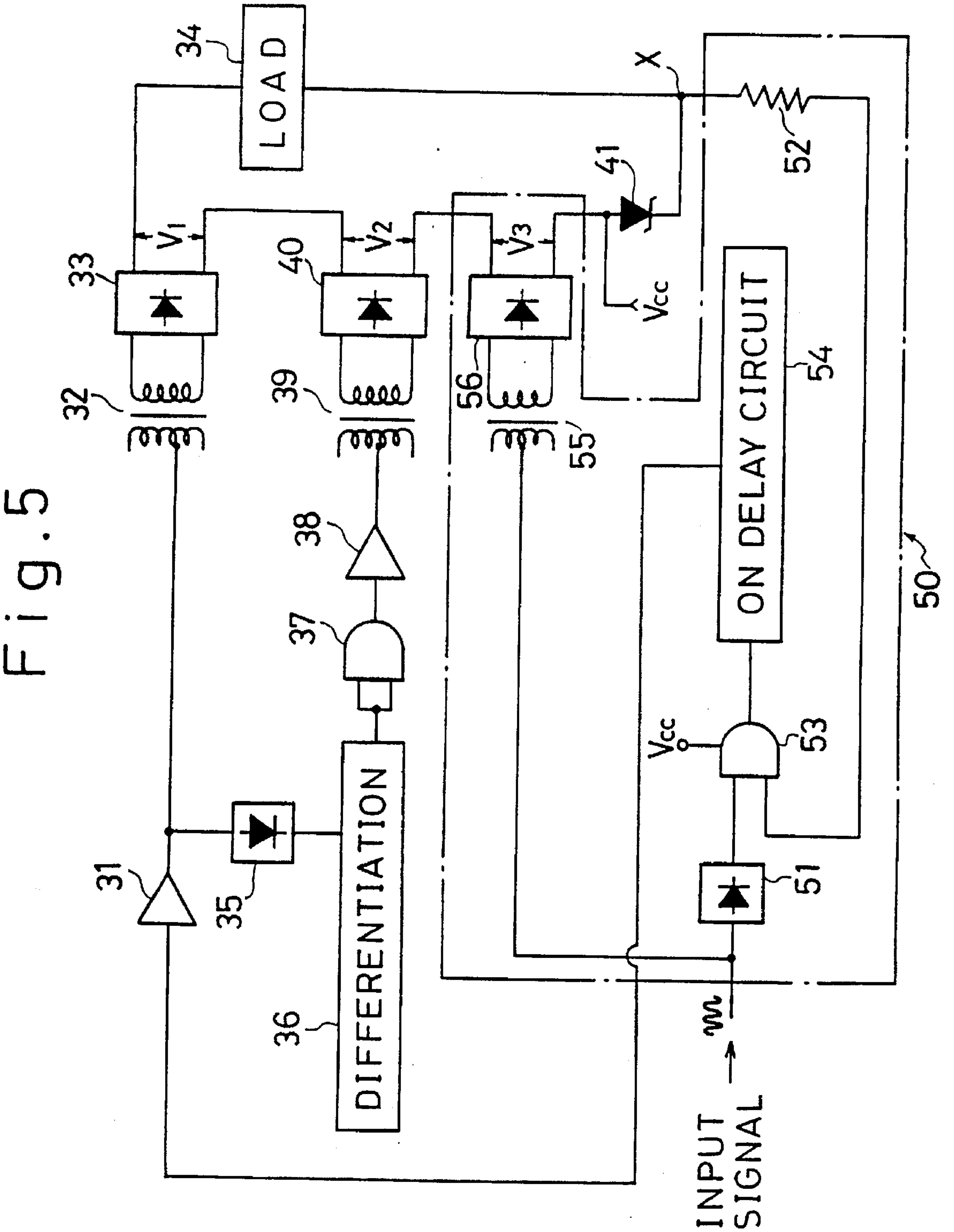
FIG. 5 is a circuit diagram showing a load driving circuit according to a second embodiment of the second invention.

In FIG. 5, a power supply circuit of a load 34 has a zener diode 41 having a zener voltage $V_Z$. The zener diode 41 is oriented to block a discharge current due to a counter electromotive force produced by the load 34 when an input signal (load driving instruction signal) is stopped. A monitor circuit 50 serving as a zener diode status monitoring unit monitors whether or not the zener diode 41 is normal. When the zener diode is abnormal, the monitor circuit stops the load driving instruction signal.

The monitor circuit 50 includes a fourth rectifier 51 for rectifying a load driving instruction signal; a fail-safe window comparator 53 having an input terminal for receiving an output of the rectifier 51 and another input terminal for receiving a voltage from anode between the load 34 and the cathode of the zener diode 41 through a resistor 52; and ON delay circuit 54 for receiving an AC output of the window comparator 53 and providing an output to an AC amplifier 31; a fourth transformer 55 for generating an AC output on a secondary winding thereof according to the input signal provided to a primary winding thereof; and a fifth rectifier 56 for rectifying the AC output of the transformer 55 and providing a rectified output V3. A constant voltage $V_{CC}$ is applied to anode between the anode of the zener diode 41 and the rectifier 56.

The window comparator 53 may be the fail-safe AND oscillator explained above. The window comparator has upper and lower threshold values with respect to an input signal. The window comparator provides an AC output only when a voltage (potential $V_X$) at an intermediate point X between the load 34 and the zener diode 41 is within a range of "$V_{CC}<V_X<=V_{CC}+V_Z$" and there is an input signal.

The operation of this load driving circuit will be explained.

To start the load, an input signal is supplied to the monitor circuit 50. The input signal is rectified by the rectifier 51, which provides a rectified output. The rectified output is supplied to one input terminal of the window comparator 53. The input signal is also supplied to the primary winding of the fifth transformer 55. The secondary winding of the transformer produces an AC output, which is rectified by the rectifier 56. The rectifier 56 provides the rectified output V3.

When the zener diode 41 is normal, a voltage at the point X in FIG. 5 in the power supply circuit of the load becomes higher than $V_{CC}$, due to the rectified output V3. The voltage at the point X is supplied to the other input terminal of the window comparator 53. The window comparator 53 provides an AC output, which is delayed by the ON delay circuit 54 for a predetermined time after the generation of the input signal. The output signal of the ON delay circuit is supplied as a signal for driving the load 34, to the AC amplifier 31. The amplifier provides an amplified driving signal according to which the rectified outputs V1 and V2 are generated through transformers 32 and 39 and rectifiers 33 and 40, similar to the first embodiment. The outputs V1 and V2 overlap each other and are supplied to start the load 34. After a while, the rectified output V2 disappears, and the steady operation of the load is maintained with the voltage V1 that is lower than the start voltage. If the zener diode 41 is normal, the voltage at the point X will be $V_{CC}+V_Z$ during the operation of the load 34, so that the window comparator 53 continuously provides an output.

When the input signal is stopped to stop the electricity to the load 34, the load 34 generates a counter-electromotive force that produces a discharge current. According to this embodiment, the power supply circuit of the load is opened to stop the load 34 by the zener diode 41 when the counter-electromotive force of the load 34 becomes lower than the zener voltage $V_Z$. This arrangement further shortens a delay in stopping the operation of the load 34.

Since the rectified output V3 generated substantially at the same time as the reception of the input signal is lower than the operation stop voltage $V_{OFF}$ of the load 34, the rectified output V3 will not start the load 34. Even if the constant voltage $V_{CC}$ is applied to the load 34, the load 34 will not start if the resistor 52 has high resistance to cause only a fine current to flow to the load 34.

An operation when the zener diode is out of order will be explained.

When the zener diode 41 is short-circuited, a potential difference between ends of the zener diode 41 disappears, and the voltage at the point X becomes $V_{CC}$. As a result, an input to the window comparator 53 becomes lower than the power source voltage $V_{CC}$ of the window comparator 53, to cause the window comparator 53 to provide no output. Accordingly, the rectified output V1 will not be generated even if there is an input signal. The load 34, therefore, receives no voltage to maintain the operation thereof. As a result, the load 34 stops.

If the zener diode 41 causes an open failure, the rectified output V3 increases because the zener diode 41, which is usually connected, is open. As a result, the voltage at the point X exceeds the upper threshold value of the window comparator 53. Then, the window comparator 53 provides no output, to thereby stop the load 34.

In this way, the operation of the load is stopped irrespective of an input signal, if the zener diode 41 becomes out of order. This results in securing fail-safe characteristics.

Figure 6:
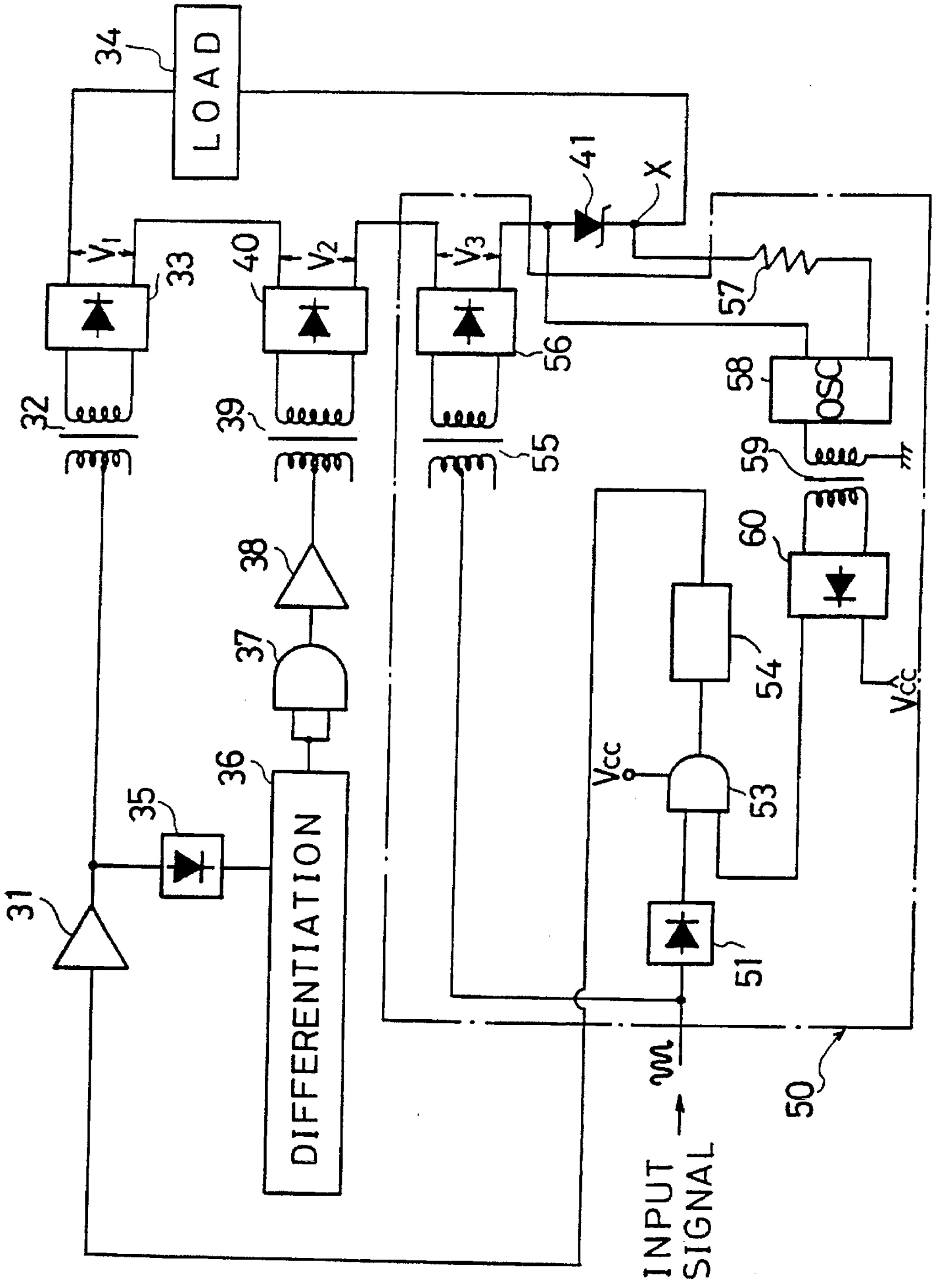
FIG. 6 is a circuit diagram showing a load driving circuit according to a third embodiment of the second invention.

FIG. 6 shows another monitor circuit 50 for monitoring the zener diode 41.

The resistance of a resistor 57 is set according to a current value that stops the operation of the load 34. An oscillator 58 is driving through the resistor 57. An output of the oscillator 58 is provided to a fifth transformer 59. An output of the transformer is rectified by a sixth rectifier 60. An output of the rectifier 60 is added to a constant voltage $V_{CC}$, which is equal to a power source voltage $V_{CC}$ of a window comparator 53. An added rectified output V4 is supplied to the window comparator 53.

Similar to the second embodiment, the oscillator 58 of this third embodiment provides no output if the zener diode 41 is short-circuited. In this case, the rectified output V4 becomes equal to the constant voltage $V_{CC}$, so that the window comparator 53 provides no output. If the zener diode 41 causes an open failure, the voltage at a point X of FIG. 6 increases, so that the rectified output V4 exceeds an upper threshold value of the window comparator 53. This results in stopping the output of the window comparator 53. In this way, this embodiment is also fail-safe because the operation of the load 34 is stopped against any failure in the zener diode 41.

A load driving circuit according to the third invention will be explained with reference to FIGS. 7 and 8.

Figure 7:
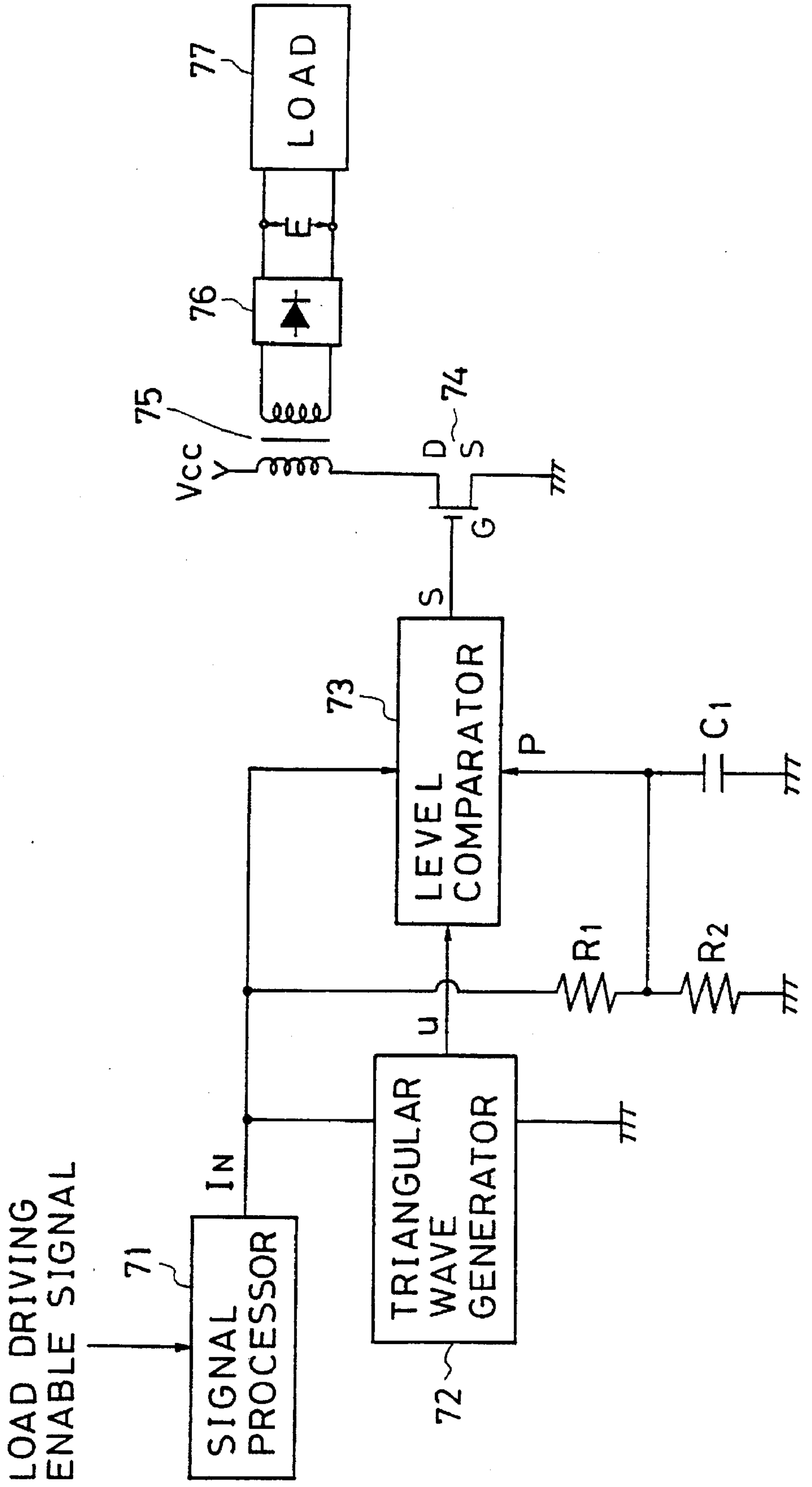
FIG. 7 is a circuit diagram showing a load driving circuit according to an embodiment of the third invention.

FIG. 7 shows an arrangement of the load driving circuit according to an embodiment of the third invention. A signal processor 71 serves as a load driving instruction signal generator and is formed of a known fail-safe AND oscillator.

When receiving a load driving enable signal from a sensor (not shown) for monitoring a safety state, the signal processor 71 provides an output (a load driving instruction signal $I_N$) of logical value 1 representing a high energy state. When receiving no load driving enable signal from the sensor, the signal processor 71 provides an output of logical value 0 representing a low energy state. When the signal processor is out of order, it never erroneously provides an output of logical value 1. Instead, it provides an output of logical value 0 representing a low level state.

Figure 8:
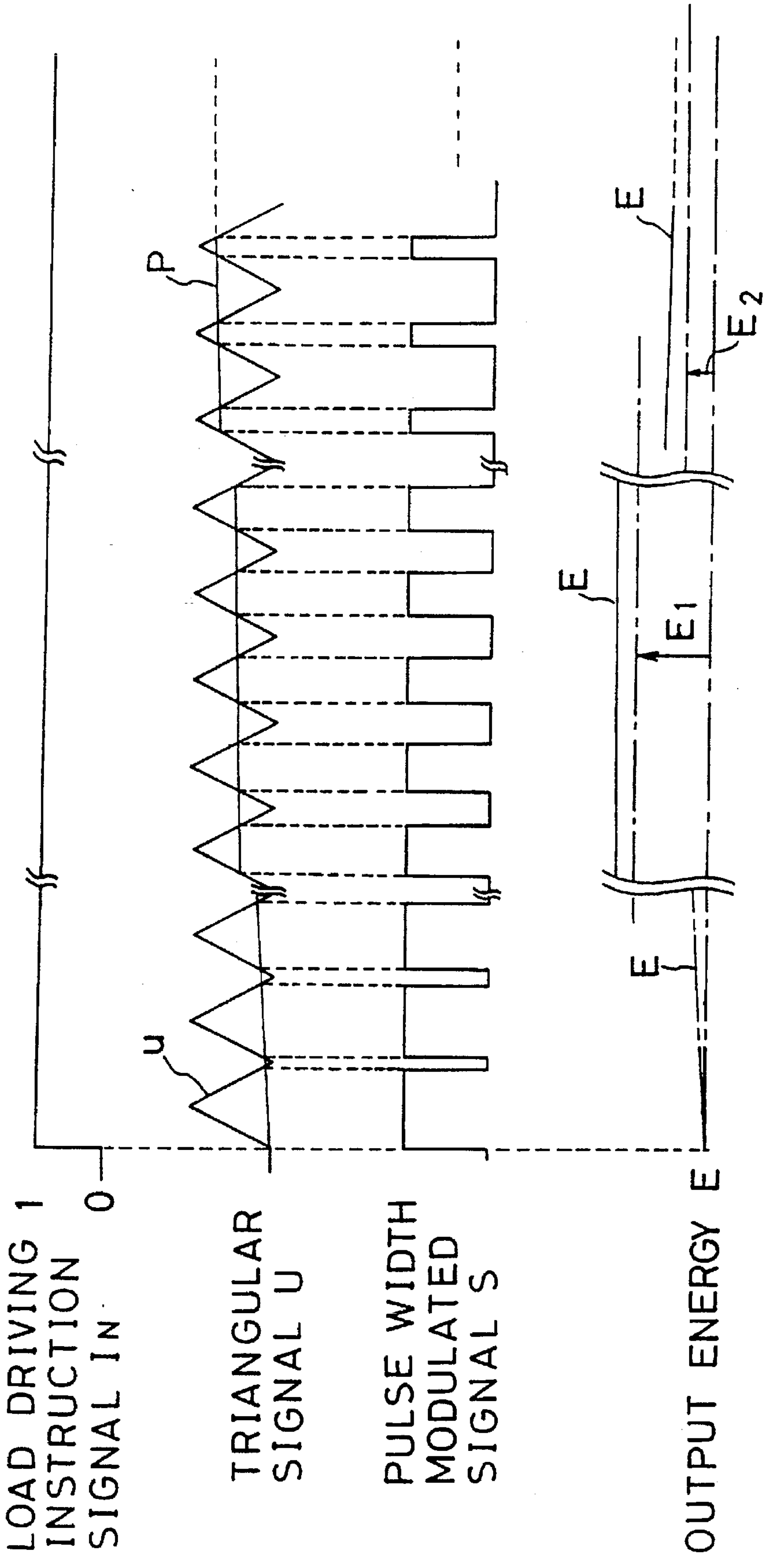
FIG. 8 is a time chart showing outputs of essential parts of the above embodiment.

A triangular wave generator 72 serves as a signal oscillator and uses the load driving instruction signal $I_N$ from the signal processor 71 as a power source, to generate a triangular signal u shown in FIG. 8.

A level comparator 73 serves as a signal comparator and uses the load driving instruction signal $I_N$ from the signal processor 71 as a power source. The level comparator 73 compares the triangular signal u of the triangular wave generator 72 with a threshold value p that gradually rises with a predetermined time constant, and provides a pulse width modulated (hereinafter referred to as PWM) output s that maintains high level while the triangular signal u is higher than the threshold value p. The time constant of the threshold value p is determined by a resistor R1 and a capacitor C1. When the capacitor C1 is saturated after a predetermined time, the threshold value p is kept at a value (=R2·V/(R1+R2)) obtained by dividing the voltage V of the load driving instruction signal $I_N$ by resisters R1 and R2.

The PWM output s of the level comparator 73 is applied to a gate G of a semiconductor switch such as a MOSFET 74. The MOSFET 74 is connected to a power source $V_{CC}$ through a primary winding of a sixth transformer 75. The source of the MOSFET 74 is grounded. According to the ON/OFF period of the PWM output s, a current of the power source $V_{CC}$ is supplied to the primary winding of the transformer 75, so that a secondary winding of the transformer 75 generates an amplified AC output due to the transformer coupling amplification. The AC output is supplied to a power supply circuit for driving a load 77. Namely, the AC output is rectified by a seventh rectifier 76, which provides a rectified output of energy E shown in FIG. 8 to the load 77 such as an electromagnetic valve or an electromagnetic relay showing hysteresis.

The operation of the load driving circuit of this embodiment will be explained.

The signal processor 71 provides the load driving instruction signal $I_N$, which drives the triangular wave generator 72 and level comparator 73. The triangular wave generator 72 generates the periodic triangular signal u as shown in FIG. 8. In response to the load driving instruction signal $I_N$, the threshold value p is provided to the level comparator 73. The threshold value p gradually rises as shown in FIG. 8 according to the time constant determined by the resistor R1 and capacitor C1. The level comparator 73 compares the threshold value p with the triangular signal u, and generates the PWM output s, which keeps a high level while the triangular signal u is higher than the threshold value p. As shown in FIG. 8, the pulse width of the PWM output s narrows as the threshold value p gradually rises. When the capacitor C1 is saturated and the threshold value p is kept at a constant value determined by the voltage dividing ratio of the resistors R1 and R2, the pulse width of the PWM output s becomes constant.

In response to the PWM output s, the MOSFET 74 periodically turns ON and OFF. According to the ON and OFF operations of the MOSFET 74 the secondary winding of the transformer 75 provides an amplified AC output, which is rectified by the rectifier 76. The energy E of the rectified output of the rectifier 76 becomes maximum when the duty ratio of the PWM output s is at about 50% as shown in FIG. 8. When the duty ratio is lower or higher than 50%, the energy E decreases, and when the capacitor C1 is saturated, the energy E keeps a constant level.

In FIG. 8, the load 77 starts to operate at an input level of E1, and stops to operate at an input level of E2. The output energy E gradually increases after the generation of the load driving instruction signal $I_N$, and when it exceeds the operation start level E1, the load 77 is turned ON. Thereafter, the output energy E decreases and then maintains a constant level. If the constant level is set to be higher than the operation stop level, the load 77 may keep an ON state at the constant level that is lower than those of prior arts.

Accordingly, the power consumption of the load 77 becomes smaller after the load is started. Compared with the conventional load driving circuits, the circuit of this embodiment is capable of greatly reducing power consumption.

The triangular wave generator 72 and level comparator 73 use the load driving instruction signal $I_N$ from the signal processor 71 as a power source, so that they will never operate if there is no load driving instruction signal $I_N$. Since the output of the MOSFET 74 is extracted through transformer coupling, the output of the level comparator 73 or of the power source $V_{CC}$ is not transferred to the secondary winding of the transformer 75, i.e., to the load 77, if the MOSFET 74 is short-circuited or broken. In this way, the load driving circuit of this embodiment will provide no rectified output for driving the load 77 if the signal processor 71 provides no load driving instruction signal $I_N$.

The signal processor 71 will never erroneously provide an output of logical value 1 if it becomes out of order. Namely, it always provides an output of logical value 0 representing a low energy state, if it is out of order.

With these arrangements, the load driving circuit of this embodiment is fail-safe to never erroneously provide load driving output E if there is no load driving instruction signal $I_N$.

According to this embodiment, the oscillation signal provided to the level comparator 73 is triangular. Instead, a signal of any shape such as a sawtooth signal or a sine wave signal is employable if the signal is capable of providing a temporally inclining output.

As explained above, the first invention provides a load driving circuit employing a non-contact breaking mechanism for breaking a primary power source, to eliminate the problems of melt and wear of contacts and improve the reliability and service life of the circuit. If the circuit fails, the supply of power to a load will be surely stopped and the load will never be erroneously driven. In this way, the circuit is highly fail-safe.

The second invention provides a load driving circuit that produces a high voltage to start a load, and thereafter, a voltage lower than the start voltage, to maintain a steady-state operation of the load. This technique shortens a delay in stopping the load, the delay being caused by a counter-electromotive force generated by the load when the load is stopped. A zener diode may be inserted in a power supply circuit of the load, to further shorten the delay in stopping the load. The status of the zener diode is always monitored, and if the zener diode fails, the supply of power to the load is stopped to ensure fail-safe characteristics.

The third invention provides a load driving circuit for driving a load that shows hysteresis that an operation start level of the load is higher than an operation stop level of the load. To start the load, the load driving circuit applies an input level to sufficiently start the load, and once the load is started, applies an input level that is lower than the operation start level but within a range to sufficiently maintain the operation of the load. Compared with the conventional load driving circuits, this circuit is able to reduce power consumption. In addition, this arrangement is fail-safe so that it never erroneously drives the load if there is no load driving instruction output, thereby greatly improving the safety and reliability of the circuit.

CAPABILITY OF EXPLOITATION IN INDUSTRY

This invention safely and efficiently drives a load that is a final controlled object of industrial equipment that requires a high degree of safety. The present invention, therefore, has a great capability of exploitation in industry.

We claim:

1. A load driving circuit for controlling the supply of power to a load by directly turning ON and OFF a switching element, which is connected in series with a power supply circuit of the load, according to a load driving instruction signal, comprising a switching power source having an input end electromagnetically coupled with a commercial primary AC power source through a first transformer and an output end electromagnetically coupled with the power supply circuit of the load through a second transformer, to supply a load driving current from the commercial AC power source to the power supply circuit of the load, a semiconductor switching element serving as the switching element, connected in series with the load in the power supply circuit of the load, to close the power supply circuit in response to the load driving instruction signal so that the current from the switching power source is supplied to the load; semiconductor switching element status detection means for detecting an ON/OFF status of the semiconductor switching element and generating a low-level output of logical value 0 if the switching element is ON, as well as if the detection means itself is out of order, and a high-level output of logical value 1 if the switching element is OFF; and power source stoppage decision means for receiving an output of the semiconductor switching element status detection means and the load driving instruction signal, and if the load driving instruction signal is absent and the output of the detection means is at low level, determining that the switching element is abnormal and providing a low-level output to stop the power supplying operation of the switching power source.

2. The load driving circuit according to claim 1, wherein the switching power source includes a first rectifier for rectifying an AC output that is produced by a secondary winding of the first transformer according to the output of the commercial AC power source; a transistor connected in series with a primary winding of the second transformer; and a first signal generator for generating an AC signal to turn ON and OFF the transistor when an output of the power source stoppage decision means is at high level.

3. The load driving circuit according to claim 1, wherein the semiconductor switching element status detection means includes a second signal generator for generating an AC signal; a magnetic core having a primary winding for receiving the AC signal from the second signal generator through a resistor, a secondary winding for receiving an AC signal from the primary winding, and a power supply line of the power supply circuit of the load; a second amplifier for amplifying the signal received by the secondary winding; and a level tester for providing a high-level output if the amplified AC output from the second amplifier is greater than a predetermined level.

4. The toad driving circuit according to claim 1, wherein the power source stoppage decision means includes a fail-safe OR circuit for providing an OR of the load driving instruction signal and the rectified output of the semiconductor switching element status detection means; a fail-safe first AND circuit for providing an AND of the load driving instruction signal and the rectified output of the semiconductor switching element status detection means; and a fail-safe second AND circuit for providing an AND of the outputs of the OR circuit and first AND circuit as a decision output to the switching power source, the second AND circuit having a function of self holding the output of the first AND circuit.

5. A load driving circuit for driving an inductive load that shows hysteresis that an operation stop voltage of the load is lower than an operation start voltage of the load, the load driving circuit rectifying an AC signal prepared from a load driving AC instruction signal and supplying the rectified signal to the load to thereby drive the load, the load driving circuit comprising first output supply means for supplying a first rectified output to the load in response to the load driving instruction signal, the level of the first rectified output being higher than the operation stop voltage and lower than the operation start voltage; and second output supply means for supplying a second rectified output only for a predetermined period in response to the-load driving instruction signal, the second rectified output overlapping the first rectified output and being supplied to the load, the level of the overlapping first and second rectified outputs being higher than the operation start voltage of the load.

6. The load driving circuit according to claim 5, wherein the second output supply means includes a second rectifier for rectifying the amplified input signal; a differential circuit having a predetermined time constant and differentiating the rectified output of the second rectifier; a fail-safe AND oscillator for providing an AND of the differentiated output of the differential circuit and providing no oscillation output if the AND oscillator itself is out of order; a second amplifier for amplifying the oscillation output of the AND oscillator; a third transformer for generating an AC output from a secondary winding thereof according to the amplified output of the second amplifier provided to a primary winding thereof; and a third rectifier for rectifying the AC output of the third transformer and providing the second rectified output to the load.

7. The load driving circuit according to claim 5, further comprising a zener diode disposed in the power supply circuit of the load, oriented in a direction to block a discharge current due to a counter-electromotive force generated by the load when the load driving instruction signal is stopped; and zener diode status monitor means for monitoring whether or not the zener diode is normal, and if it is abnormal, stopping the supply of the load driving instruction signal to the first output supply means.

8. The load driving circuit according to claim 7, wherein the monitor means includes a fourth rectifier for rectifying the load driving instruction signal; a fail-safe window comparator having an input terminal for receiving a rectified output voltage from the fourth rectifier and another input terminal for receiving a voltage from a node between the load and the cathode of the zener diode in the power supply circuit of the load through a resistor, providing an output only when the rectified output voltage is present and the voltage from the power supply circuit of the load is within a predetermined range, and stopping the output if the window comparator itself is out of order; an ON delay circuit for providing an output to the first output supply circuit a predetermined delay time after receiving the output of the window comparator; a fourth transformer for generating an AC output from a secondary winding thereof according to the load driving instruction signal provided to a primary winding thereof; and a fifth rectifier for rectifying the AC output of the fourth transformer and providing a third rectified output, which is lower than the operation stop voltage of the load, to a node between the load and the anode of the zener diode in the power supply circuit, the same voltage as the power source voltage of the window comparator being applied to a node between the anode of the zener diode and the fifth rectifier.

9. The load driving circuit according to claim 8, wherein the zener diode status monitor means includes, instead of applying the same voltage as the power source voltage of the window comparator to the node between the anode of the zener diode and the fifth rectifier, an oscillator to be driven according to a terminal voltage of the zener diode; a fifth transformer for generating an AC output from a secondary winding thereof according to the oscillation output of the oscillator applied to a primary winding thereof; and a sixth rectifier for rectifying the AC output of the fifth transformer, a rectified output of the sixth rectifier being applied to the window comparator.

* * * * *